US011985959B2

(12) United States Patent
Penner et al.

(10) Patent No.: US 11,985,959 B2
(45) Date of Patent: May 21, 2024

(54) FISH PEN FOR OPEN SEA AQUACULTURE

(71) Applicant: InnovaSea Systems, Inc., Boston, MA (US)

(72) Inventors: Mark Penner, Dorchester, MA (US); David P. Kelly, Scituate, MA (US); Peter Nicholas Woskov, Everett, MA (US); Harrison P. Zimmer, Bainbridge Island, WA (US); Jeffrey Reifsnyder, Fond du Lac, WI (US); Rafael Cordero, Bedford, MA (US); Wyatt Grass, Fort Bragg, CA (US); James Fitzgerald, Boston, MA (US); Todd Vangsness, Stow, MA (US); Matthew Darres, Northport, ME (US)

(73) Assignee: Innovasea Systems, Inc., Boston, MA (US)

( * ) Notice: Subject to any disclaimer, the term of this patent is extended or adjusted under 35 U.S.C. 154(b) by 0 days.

(21) Appl. No.: 16/942,384

(22) Filed: Jul. 29, 2020

(65) Prior Publication Data
US 2021/0029974 A1    Feb. 4, 2021

Related U.S. Application Data

(60) Provisional application No. 62/880,263, filed on Jul. 30, 2019.

(51) Int. Cl.
*A01K 61/60* (2017.01)
*A01K 61/10* (2017.01)

(52) U.S. Cl.
CPC .............. *A01K 61/60* (2017.01); *A01K 61/10* (2017.01)

(58) Field of Classification Search
CPC ................................ A01K 61/60; A01K 61/65
(Continued)

(56) References Cited

U.S. PATENT DOCUMENTS 1,485,875 A    3/1924  O'Malley
1,614,600 A    1/1927  Cleaver
(Continued)

FOREIGN PATENT DOCUMENTS

CN    204 217 669         3/2015
CN    204217669 U  *      3/2015
(Continued)

OTHER PUBLICATIONS

English-language translation of CN 204217669 (Year: 2015).*
(Continued)

*Primary Examiner* — Joshua J Michener
*Assistant Examiner* — Henry Hooper Mudd
(74) *Attorney, Agent, or Firm* — Christensen O'Connor Johnson Kindness PLLC (57) ABSTRACT

An aquaculture pen includes an annular floatation assembly formed from a plurality of float platforms connected end to end. A weight ring is suspended from the floatation assembly by a first plurality of tension members at a central portion of the float platforms. A net support ring is suspended from the floatation assembly by a second plurality of tension members that are attached to the floatation assembly, for example, outboard of the first plurality of tension members. A mesh enclosure for the pen includes a main portion attached to the net support ring, a jump net portion that extends from the net support ring to engage the inboard side of the floatation assembly, and a top portion that closes an upper end of the mesh enclosure.

15 Claims, 7 Drawing Sheets

(58) Field of Classification Search
USPC .................................................. 119/223, 224
See application file for complete search history.

(56) References Cited

U.S. PATENT DOCUMENTS

| | | |
|---|---|---|
| 2,606,350 A | 8/1952 | French |
| 3,691,994 A | 9/1972 | McPherson |
| 3,702,709 A | 11/1972 | Shaffer |
| 3,992,737 A | 11/1976 | Duel |
| 4,147,130 A | 4/1979 | Goguel |
| 4,252,081 A | 2/1981 | Smith |
| 4,312,296 A | 1/1982 | Stelleman |
| 4,337,553 A | 7/1982 | Fischer |
| 4,380,213 A | 4/1983 | Blair |
| 4,615,301 A | 10/1986 | Maekawa |
| 4,747,369 A | 5/1988 | Götmalm |
| 4,798,169 A * | 1/1989 | Rosen ............... A01K 61/60 119/223 |
| 4,957,064 A | 9/1990 | Koma |
| 5,172,649 A | 12/1992 | Bourgeois |
| 5,193,481 A | 3/1993 | Loverich |
| 5,299,530 A | 4/1994 | Mukadam et al. |
| 5,359,962 A | 11/1994 | Loverich |
| 5,617,813 A | 4/1997 | Loverich |
| 5,845,602 A * | 12/1998 | Kaarstad ............ A01K 61/60 119/223 |
| 6,044,798 A | 4/2000 | Foster |
| 6,892,672 B2 | 5/2005 | Klein |
| 7,650,856 B2 * | 1/2010 | Cortinas ............ A01K 61/00 119/223 |
| 7,681,528 B2 | 3/2010 | Ytterland |
| 7,743,733 B2 | 6/2010 | Harrison et al. |
| 7,992,522 B2 | 8/2011 | Harrison et al. |
| 8,028,660 B2 | 10/2011 | Troy |
| 8,424,491 B2 | 4/2013 | Page |
| 8,651,059 B2 | 2/2014 | Cartwright et al. |
| 9,072,282 B2 | 7/2015 | Madsen et al. |
| 9,321,511 B2 | 4/2016 | Naess |
| 9,392,774 B2 | 7/2016 | Page |
| 9,737,057 B2 | 8/2017 | Page |
| 2006/0096548 A1 | 5/2006 | Ytterland |
| 2006/0207516 A1 * | 9/2006 | Tuerk ............... A01K 61/60 119/223 |
| 2007/0089681 A1 * | 4/2007 | Hannon ............. A01K 1/034 119/223 |
| 2007/0169711 A1 | 7/2007 | Sims |
| 2008/0110408 A1 | 5/2008 | Thorvardson |
| 2010/0018470 A1 | 1/2010 | Kim |
| 2010/0058991 A1 | 3/2010 | Dobson et al. |
| 2014/0109837 A1 | 4/2014 | Page |
| 2014/0299065 A1 | 10/2014 | Cartwright et al. |
| 2017/0238511 A1 * | 8/2017 | Gace ............... A01K 61/60 |
| 2018/0139935 A1 * | 5/2018 | Zheng ............... A01K 61/65 |
| 2019/0387721 A1 | 12/2019 | Dobson et al. |

FOREIGN PATENT DOCUMENTS

| | | | |
|---|---|---|---|
| CN | 106 472 379 | 3/2017 | |
| FR | 2 596 613 A1 | 10/1987 | |
| GB | 2558302 A * | 7/2018 | ............ A01K 63/10 |
| JP | 62-172358 U | 10/1987 | |
| SE | 458 088 B | 2/1989 | |
| WO | 1987/003170 A1 | 6/1987 | |
| WO | 96/02132 | 2/1996 | |
| WO | WO-9602132 A1 * | 2/1996 | ............ A01K 61/60 |
| WO | WO-9806254 A1 * | 2/1998 | ............ A01K 61/60 |
| WO | WO-9812918 A1 * | 4/1998 | ........... A01K 63/006 |
| WO | WO-03063583 A2 * | 8/2003 | ............ A01K 61/54 |
| WO | 2004/002221 | 1/2004 | |
| WO | WO-2004002221 A1 * | 1/2004 | ............ A01K 61/60 |
| WO | 2006/137128 | 12/2005 | |
| WO | 2008/134842 A1 | 11/2008 | |
| WO | 2013/085392 A1 | 6/2013 | |
| WO | 2014/077159 A1 | 5/2014 | |
| WO | 2014/189383 | 11/2014 | |
| WO | WO-2014189383 A1 * | 11/2014 | ............ A01K 61/60 |
| WO | WO-2017173543 A1 * | 10/2017 | ............ A01K 61/10 |
| WO | 2018/091431 A1 | 5/2018 | |
| WO | WO-2018169407 A1 * | 9/2018 | ............ A01K 61/65 |
| WO | WO-2021021928 A1 * | 2/2021 | ............ A01K 61/60 |

OTHER PUBLICATIONS

English-language translation of WO 9806254 (Year: 1998).*
International Search Report and Written Opinion dated Aug. 27, 2012, issued in International Application No. PCT/US2011/067610, filed Dec. 28, 2011, 7 pages.
International Search Report and Written Opinion dated Sep. 6, 2019, issued in International Application No. PCT/CA2019/050882, filed Jun. 25, 2019, 7 pages.
International Preliminary Report on Patentability dated Feb. 1, 2022, issued in corresponding International Patent Application No. PCT/US2020/044063, filed Jul. 29, 2020, 8 pages.
European Search Report dated Aug. 4, 2023, issued in corresponding EP Application No. 20848518.5, filed Jul. 29, 2020, 10 pages.

* cited by examiner

FISH PEN FOR OPEN SEA AQUACULTURE

CROSS-REFERENCE TO RELATED APPLICATION

This application claims the benefit of Provisional Application No. 62/880,263, filed Jul. 30, 2019, the entire disclosure of which is hereby incorporated by reference herein.

BACKGROUND

For millennia, the seas and other natural water reservoirs have provided an abundant and stable supply of sustenance. In recent years, however, overfishing, inefficient harvesting practices, and environmental stressors have resulted in the depletion or decline of certain fish populations in many regions. At the same time, an increasing human population, increasing standards of living, and an increasing awareness of the health benefits of seafood have increased the demand for fish and fish product.

Advances in aquaculture in general and fish farming in particular, as well as improvements in technology, have enabled significant progress to be made to efficiently address increasing world demand for fish product at lower costs. Developments in fish farming also reduce the risks associated with overfishing indigenous fish populations. In particular, offshore aquaculture systems, also known as open-ocean aquaculture, employing fish cages or fish pens, have found some success. Large, submersible fish pens suitable for aquaculture applications are known in the art to aid in the efficient and bio-responsible cultivation of food sources. In open-ocean aquaculture large fish pens are positioned some distance offshore, in deeper and less-sheltered waters, where ocean currents are relatively strong. The fish pens are stocked with young fish or fry, and the fish are fed and maintained until they reach maturity. The fish pens provide a habitat and protection for the fish. Similar fish pens may also be used for freshwater aquaculture, for example, in larger freshwater bodies of water.

A disadvantage of inshore aquaculture systems is that waste products from a fish farm can settle below the fish cage and accumulate on the seafloor, with potential adverse effects to the ecosystem of the benthic zone. By providing systems configured to retain the farm fish in offshore locations, the waste products are more rapidly swept away from the site and diluted. Offshore systems, away from more heavily trafficked inshore locations, are more readily sited and expanded to meet the increasing demands.

Examples of open sea fish pen systems are disclosed in U.S. Pat. No. 5,359,962, to Loverich, and in U.S. Pat. No. 5,617,813, to Loverich et al., both of which are hereby incorporated by reference in their entireties. Loverich et al. discloses a mobile pen for growing fish or shellfish wherein a central vertical spar buoy is surrounded by one or more horizontal rim assemblies. A mesh/netting extends from an upper end portion of the spar buoy outward to the rim assemblies, and then inward from the rim assembly to a lower end portion of the spar buoy. U.S. Pat. No. 9,072,282, to Madsen et al., which is also hereby incorporated by reference, discloses a spar buoy fish pen assembly with a deployable system for segregating a population of fish within a fish pen, and/or for crowding the fish into a smaller space, for example, to facilitate treatment or harvesting operations.

A current industry standard fish pen, also called a "surface pen," is comprised of a cylindrical net which is supported by a "buoyancy ring" on the surface. In some cases, a weight ring is added around the bottom of the net to help hold the net open in a current. The simple and cheap forms of the rings and the high volume enclosed to net surface ratio of the cylinder helps keep pen costs low. As the cylindrical form is common and has been in use for an extended time, operational procedures and equipment have been developed and refined, and experienced operators are already familiar with them.

One of the major pitfalls of the standard surface pen is that it requires a consistently calm sea state. The buoyancy ring is typically made of multiple HDPE pipes sealed and bent into rings. This type of structure is unlikely to survive a hurricane (or another large storm), cannot withstand the waves of the open ocean, and will need to be fully replaced periodically due to fatigue. Requiring a protected bay in an area that doesn't see large storms greatly limits the available geographical area in which these pens can be used.

One solution to surviving a major storm is to submerge the structure below the water surface. By adding a submergence capability to a pen of a cylindrical shape, those that are familiar with operating surface pens can have a comfortable bridge to a pen design which can operate in areas with occasional major storms. By utilizing a series of rigid structures with flexible joints between them, the fatigue of a fully resilient system can be focused to small, replaceable components. Focusing the strain of moving with the waves on these flexible components allows the primary rigid structures, and by extension the pen, to endure significantly longer than a traditional HDPE surface pen.

A number of issues in prior art fish pens have been found. For example, the dynamic environment of the open sea presents challenges for existing fish pens. Current float systems (float rings) for prior art open sea fish pens experience excessive stresses at the joints connecting the float platform sections, particularly in rough sea conditions, resulting in undue wear and/or joint components failures, collisions between the float platforms due to twist during the sinking procedure, and the like. There is a need for improvements to joint designs for connecting floatation platforms for fish pens. There remains a need for improvements to the overall architecture of the open sea fish pen, including the overall system design connection for connecting the float ring to the fish enclosure assembly, and the systems for stabilizing, and/or raising and lowering the fish pen.

Prior art surface pens typically include a main net-like fish enclosure that hangs from an inboard side of a flotation ring. When attempting to support very large, or very heavy net enclosures such as copper alloys, this causes the flotation ring to list inboard. To counter the listing, a number of solutions can be deployed including additional weight, buoyancy, or structure, all of which require additional engineering consideration and cost. When the pen is submerged, due to the variable buoyancy not being exactly over the center of mass, the floats also have a tendency to list significantly either inboard or outboard, placing significant stress on the joints among other concerns.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An aquaculture pen has an annular floatation assembly assembled from a plurality of float platforms connected end to end with platform joints. A weight ring is suspended from the floatation assembly by a first plurality of tension members that are attached to a bottom side of the floatation assembly at first transverse locations between the inboard side and the outboard side of the floatation assembly. A net support ring is suspended from the floatation assembly by a second plurality of tension members that are attached to the bottom side of the floatation assembly at second transverse locations in a middle one-third of the floatation assembly between the inboard side and the outboard side of the floatation assembly. A mesh enclosure is supported by the annular floatation assembly and net support ring, and includes a main portion with an upper end attached to the net support ring, a jump net portion that extends from the net support ring to the inboard side of the floatation assembly, and a top portion that closes an upper end of the mesh enclosure.

In an embodiment the first transverse locations are also located in the middle one-third of the floatation assembly between the inboard side and the outboard side of the floatation assembly.

In an embodiment the first transverse locations are outboard of the second transverse locations.

In an embodiment the plurality of float platforms each include a main body portion and a rail assembly extending upwardly from an inboard side of the float platform.

In an embodiment the jump net portion of the mesh enclosure extends to a top end of the rail assembly.

In an embodiment a plurality of upper spoke cables extend across the floatation assembly and connect non-adjacent float platforms. In an embodiment a net stand is located within a region surrounded by the annular floatation assembly and engages the plurality of upper spoke cables.

In an embodiment the floatation assembly has eight float platforms that define an octagonal annular structure.

In an embodiment the floatation platforms each include a frame, a plurality of fixed floatation members disposed in the frame, and a plurality of variable floatation members disposed in the frame. For example the fixed floatation members may be disposed at opposite ends of the floatation platforms and the variable floatation members may be disposed between the fixed floatation members.

In an embodiment the aquaculture pen is configured to be moved between a surfaced position and a submersed position.

In an embodiment the platform joints permit the connected platforms to pivot about an axis defined by the platform joint.

In an embodiment a plurality of pendant weights are suspended from the weight ring.

An aquaculture pen includes a floatation assembly that includes a plurality of float platforms connected end-to-end to define a closed polygon. A weight ring is suspended from the floatation assembly by a first plurality of cables that are attached to central portions of the floatation assembly between an inboard side and an outboard side of the floatation assembly. A net support ring is suspended from the floatation assembly by a second plurality of tension members that are attached to central portions of the floatation assembly in a middle one-third of the floatation assembly between the inboard side and the outboard side of the floatation assembly. A mesh enclosure includes a main portion that is attached to the net support ring, a jump net portion that extends from the net support ring to an inboard side of the floatation assembly, and a top portion that closes an upper end of the mesh enclosure.

In an embodiment the first plurality of cables are attached to the floatation assembly outboard of the second plurality of cables.

In an embodiment the plurality of float platforms include a main body portion and a rail assembly extending upwardly from an inboard side of the float platform.

In an embodiment the jump net portion of the mesh enclosure extends to a top end of the rail assembly.

In an embodiment a plurality of upper spoke cables extend across the floatation assembly and connect non-adjacent float platforms.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
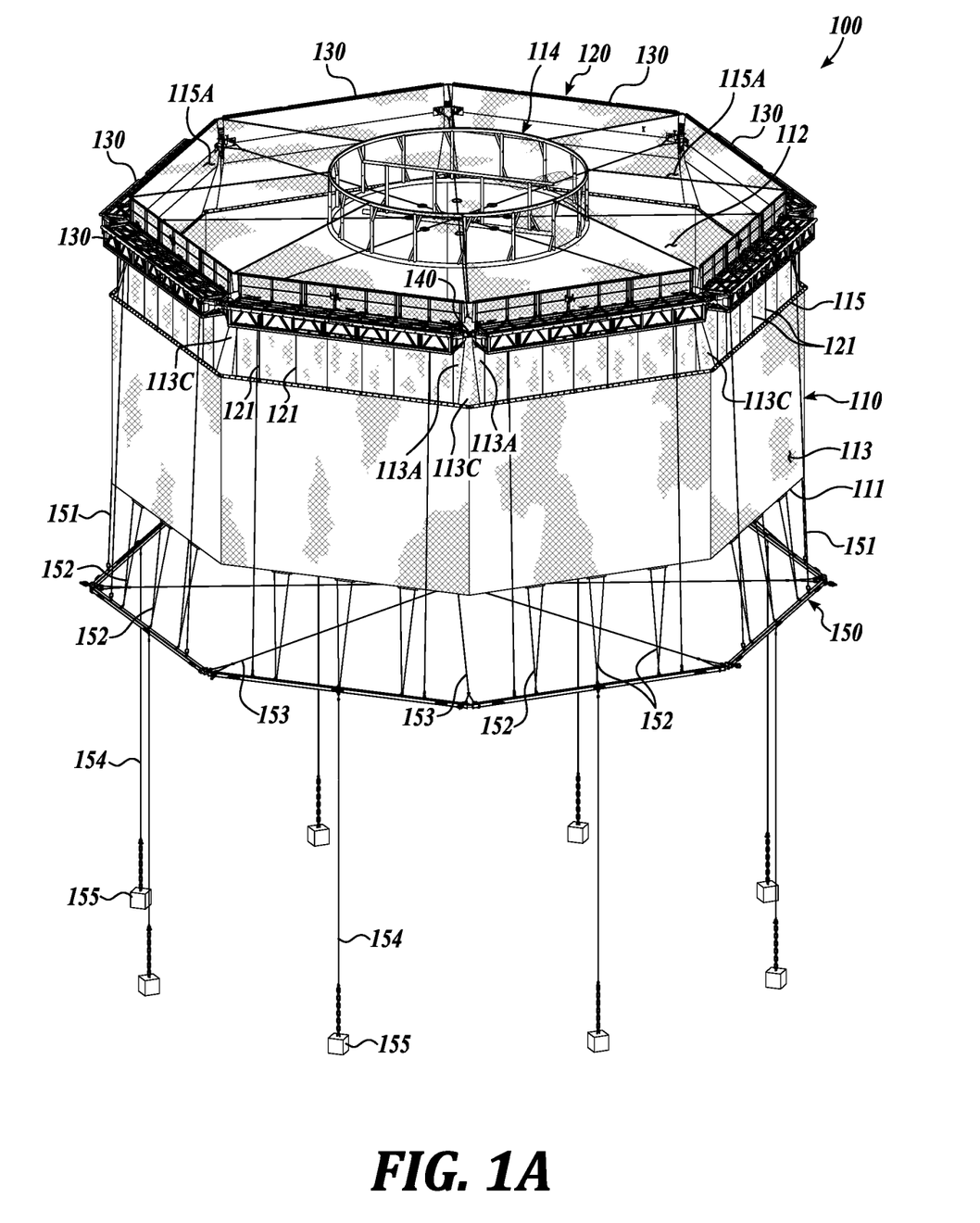
FIG. 1A is a perspective view of an open sea aquaculture pen in accordance with the present invention.
Figure 1B:
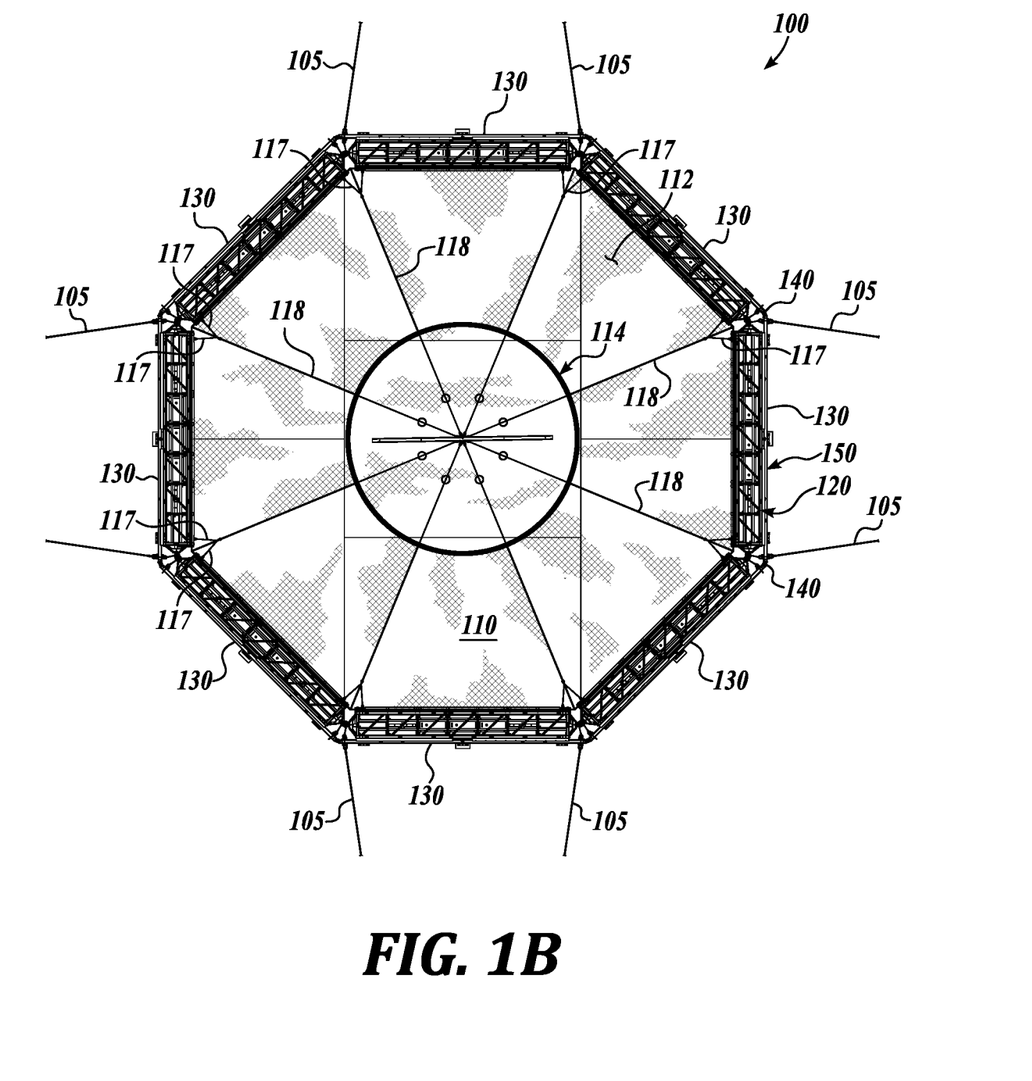
FIG. 1B is a plan view of the open sea aquaculture pen shown in FIG. 1A.

FIG. 1A shows a perspective view of an aquaculture pen 100 in accordance with the present invention, and referred to herein as fish pen 100. The fish pen 100 is intended for open water aquaculture, for example in off-shore saltwater location or an inland fresh water location. Refer also to FIG. 1B which shows a plan view of the fish pen 100. In this embodiment the fish pen 100 is configured to be controllably submersible such that the entire fish pen 100 can be controllably moved between a surfaced position and a submerged position. In the surfaced position an upper portion of the fish pen 100 is at or above a surface of the body of water, in the submerged position the entire fish pen 100 is below a top surface of the body of water. Submergibility is advantageous, for example to protect the fish pen 100 structure from dynamic stresses on the structure from wave action and other weather-induced dynamics.

The fish pen 100 includes a mesh enclosure assembly 110 that is configured to confine a fish population therein while permitting water flow through the enclosure assembly 110. The mesh enclosure assembly 110 is discussed in more detail below, and includes a lower main portion 113, an upper jump net portion 113A, and a cover panel 112 that closes a top end of the mesh enclosure assembly 110. The mesh enclosure assembly 110 is attached to an annular floatation assembly 120. A weight ring 150 is suspended from the floatation assembly 120, for example with a plurality of tension members 151, for example cables, chains, ropes, cords, or the like. In the embodiment shown in FIG. 1A the weight ring 150 is disposed below a bottom end of the enclosure assembly 110. In other embodiments the weight ring 150 may be located at or above a bottom end of the enclosure assembly 110. Optional pendant weights 155 and/or mooring lines and the like may be attached to the weight ring 150. In the current embodiment the weight ring 150 is octagonal with a plurality of tension lines or spoke lines 153 that extend across the weight ring 150 connecting opposite vertices of the weight ring 150. The spoke lines 153 aid in maintaining the weight ring 150 in the desired shape, with uniform angles between adjacent sections. As seen most clearly in FIG. 1A, lower tension members 152 connect a lower end portion of the mesh enclosure assembly 110 to the weight ring 150.

In some embodiments multiple fish pens 100 may be deployed in an array of fish pens 100 and interconnected, for example through a mooring system in a grid using cables, chains, or the like 105 (see, FIG. 1B) that extend between and connect the weight rings 150 of the individual fish pens 100. In some embodiments a connecting/mooring system connects multiple fish pens 100 through their respective floatation assemblies 120.

The floatation assembly 120 is configured to transition the fish pen 100 between a net positive buoyancy state and a net negative buoyancy state. The floatation assembly 120 comprises a plurality of float platforms 130 that are connected end-to-end by joints 140 to form an annular (octagonal) floatation structure. The joints 140 permit rotational motion between adjacent float platforms 130 about the axis of the connecting joint 140. In other embodiments the floatation assembly may include more or fewer float platforms 130, for example four, five, seven, nine, or more float platforms.

A plurality of spokelines or spoke cables 118 extend between and connect non-adjacent float platforms 130. In this example the spokelines 118 are disposed approximately radially across the floatation assembly 120. The spoke cables 118 have a radially inner end that connects to a center ring (not shown), and a Y-shaped outer end 117 that connects to the inner ends of adjacent float platforms 130. The spokelines 118 prevent the floatation assembly 120 from compressing. For example, if external forces on adjacent float platforms 130 are directed to urge the platforms 130 toward an orientation wherein the included angle between the adjacent float platforms 130 decrease, tension in the spokelines 118 will react to maintain the desired shape of the floatation assembly 120. In an alternative embodiment (not shown) the function of the spokelines 118 may be accomplished with lines between floats located peripherally to the fish pen, for example high strength lines sized to limit relative yaw to a design maximum angle. In another alternative embodiment it is contemplated that spokelines may alternatively or additionally be provided that extend between float platforms 130 that are not directly opposite to each other. In particular, by reacting to and reducing deformation of the floatation assembly 120 the spokelines 118 reduce the stresses and load cycles on the flexible joints 140 connecting the float platforms 130.

Figure 2A:
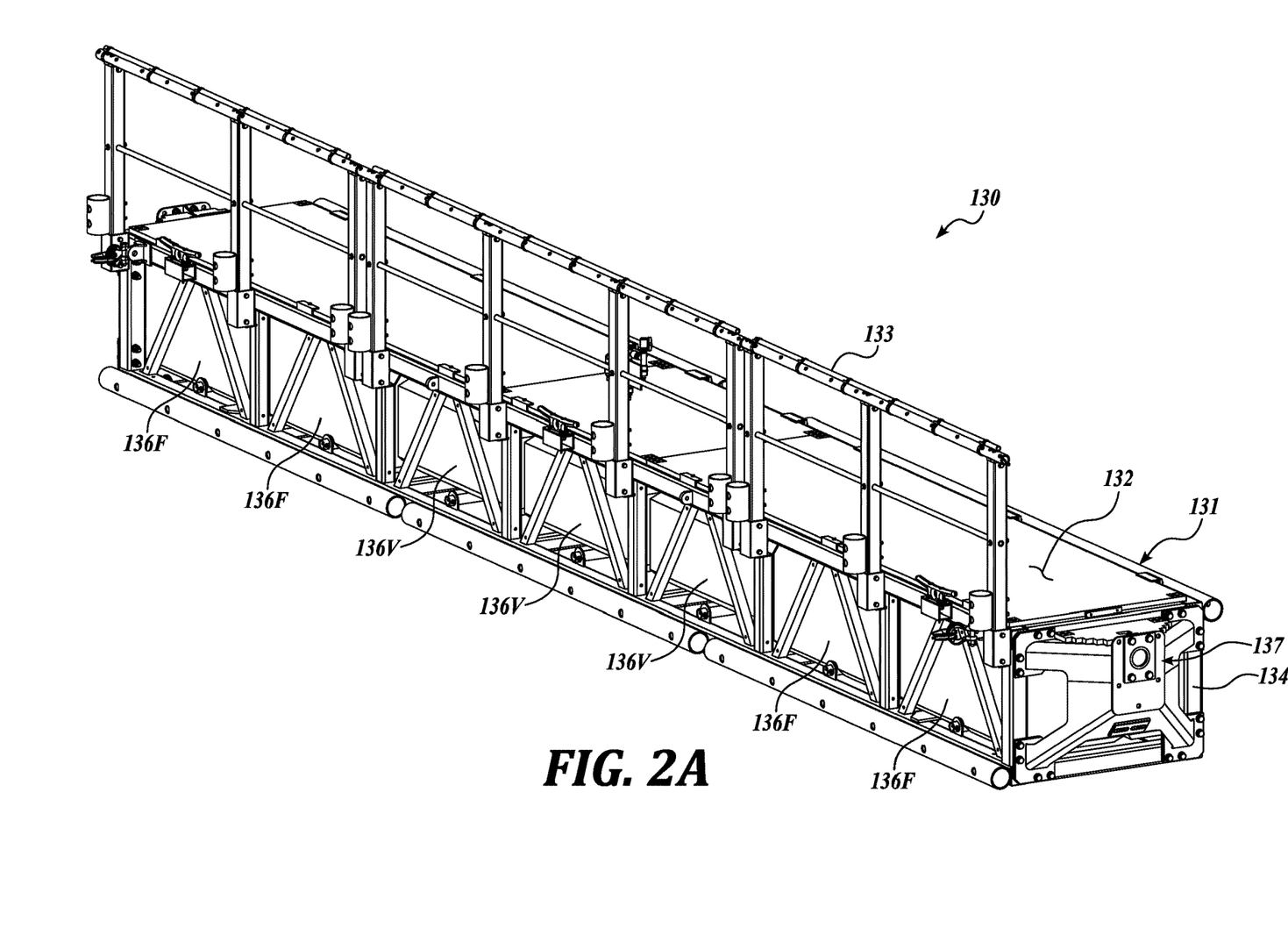
FIG. 2A is a perspective view of a float platform of the open sea aquaculture pen shown in FIG. 1A with associated portions of the mesh enclosure and intermediate net ring.
Figure 2B:
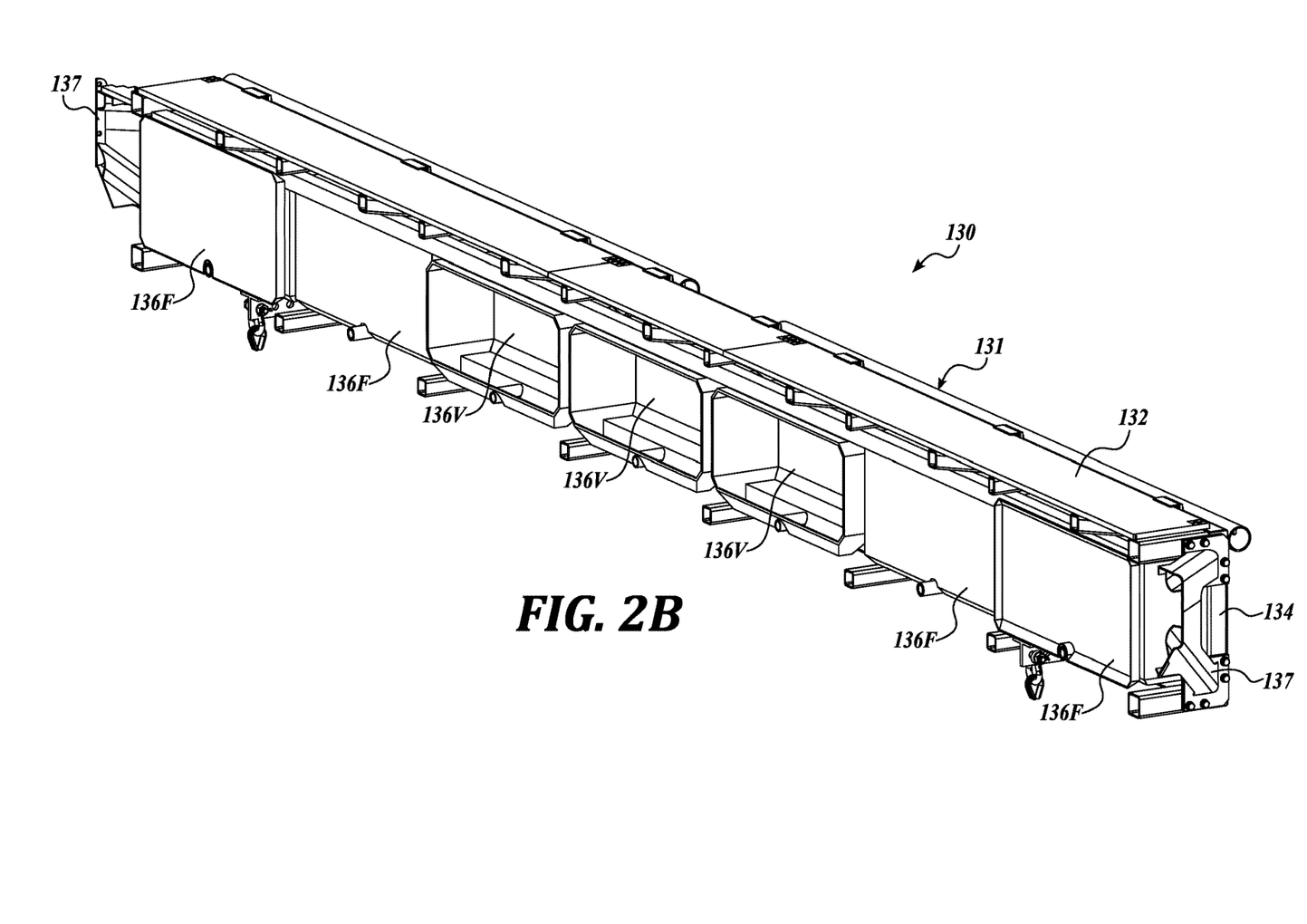
FIG. 2B is a side view of the float platform shown in FIG. 2A.

Refer now also to FIG. 2A, which shows a perspective view of a float platform 130 in isolation, and to FIG. 2B which shows a corresponding longitudinal section view of the float platform 130 shown in FIG. 2A. The float platform 130 includes a main body 131 that in this embodiment includes a rectangular frame 134 with joint support frames 137 on each end. An upper surface or access way 132 is supported on an upper side of the frame 134. A rail assembly 133 extends upwardly from an inboard side of the rectangular frame 134.

A plurality of fixed floatation members 136F and variable floatation members 136V are located within the rectangular frame 134 below the access way 132. The fixed floatation members 136F are preferably located generally on the left and right end portions of the platform 130. The fixed floatation members 136F may be formed, for example, as solid foam blocks or as sealed hollow tanks. The variable floatation members 136V are preferably located centrally in the frame 134 between fixed floatation members 136F. For example, the variable floatation members 136V may be tanks configured to be controllably and adjustably filled or partially filled with a gas (e.g., air) to increase buoyancy or with a liquid (e.g., water) to decrease buoyancy. The variable floatation members 136V are controlled to transition the fish pen 100 between a net negative buoyancy to submerge the fish pen 100, and a net positive buoyancy to raise the fish pen 100 and to maintain the fish pen 100 at the surface of the body of water. It will be appreciated by persons of skill in the art that in the surfaced position the fish pen 100 is readily accessible for maintenance, repair, upgrade, and the like. In the submerged position the fish pen 100 is better protected from the wear and tear associated with waves and storms. In the currently preferred embodiments the variable floatation members 136V are also centered in the rectangular frame 134 transversely generally along or near a longitudinal centerline of the float platform 130. For example, the variable floatation members 136V may include solid or sealed inboard and outboard portions, such that the variable portion of the buoyancy forces are centrally located on the float platform 130. The centered variable floatation members 136V, in combination with the support system for the mesh enclosure assembly 110 and the weight ring 150, have been found to significantly improve the stability of the fish pen 100 when the fish pen 100 is raised from a submerged position to a surface position.

In a current embodiment a ballast control system or pneumatic control system (not shown), for example a fluid pump and control system as are known in the art, provides air and water to the variable floatation members 136V of all of the float platforms 130 to control the buoyance of the fish pen 100, e.g., to permit the fish pen 100 to be moved between a surfaced elevation wherein the floatation assembly 120 is located at a surface of the body of water, and a submerged elevation wherein the floatation assembly 120 is fully submerged. In this embodiment a sectional system is used to balance the distribution of air into the float platforms 130 when surfacing the fish pen 100. Individual air supply lines are run from a surface vessel to the different sections of the floatation assembly 120. In this example, four controlled sections are evenly spread around the fish pen 100 with a line to the surface, referred to as quadrant control. Positively injecting air into the variable floatation members 136V in the float platforms 130 is performed to ensure that the buoyancy between the sections is balanced, such that the fish pen 100 retains its desired orientation (e.g., with the floatation assembly 120 level in the water). By cycling a single compressor through pressurizing the different sections it is possible to bring the pen to the surface levelly without diver intervention. For example, in an embodiment a float valve arrangement is used to allow water to flow in or out but to automatically close to retain air pressure. With a bell-jar style variable buoyancy chamber, air pressure pushes water out the bottom of the chamber, but the bottom is open such that the fluids find a pressure balance naturally.

In this float valve arrangement, a buoyant element is used as the closing and sealing member, such that as air pushes water out, the buoyant element lowers with the water level until seating and allowing air pressure to build up behind it. When air pressure is relieved, hydrostatic pressure pushes the buoyant element up, and fluid can enter the chamber again.

Other methods for controllably adjusting the flow of air and/or water to the variable floatation tanks 136V to controllably raise or submerge the fish pen will be apparent to persons of skill in the art.

Figure 3:
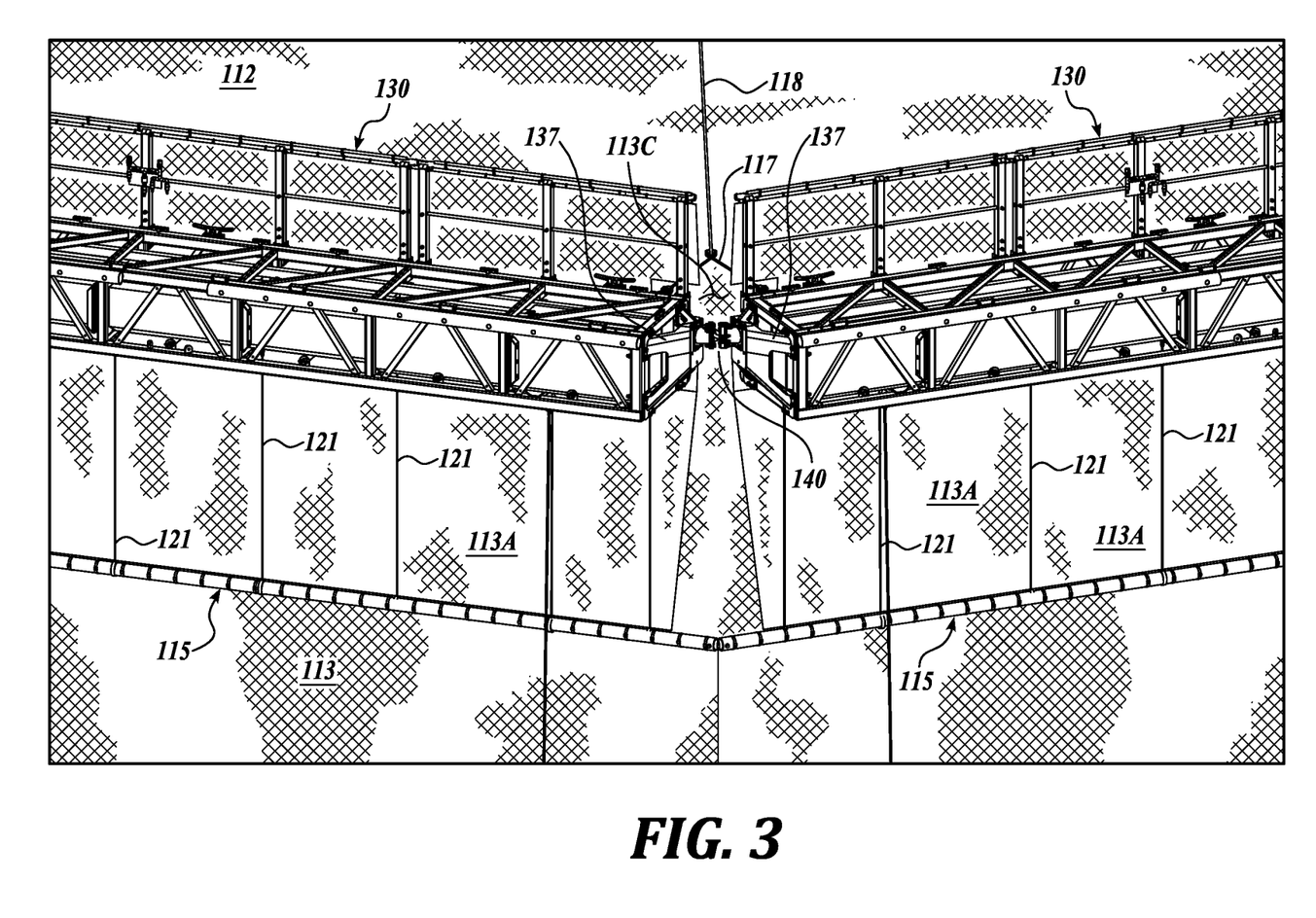
FIG. 3 is a detail view of a portion of the open sea aquaculture pen shown in FIG. 1A, showing a joint region connecting two float platforms of the floatation assembly.

The mesh enclosure assembly 110 will now be described, referring again to FIGS. 1A and 1B, and also to FIG. 3, showing a detail view of an upper portion of the fish pen 100.

The mesh enclosure assembly 110 includes a main portion 113 comprising a floor or lower transverse portion 111 and an upright wall portion that extends upwardly from the perimeter of the lower portion 111. An upper end of the main portion 113 is attached to an intermediate net support ring 115 suspended below the float platform 130 with a plurality of cables 121. An upper net portion 113A, referred to as a jump net portion 113A, is attached to an inboard side of the float platform 130 and extends downwardly to the intermediate net support ring 115. A lower end of the jump net portion 113A is attached to the net support ring 115 and/or to the main portion 113. In a current embodiment the jump net portion 113A includes a plurality of separate panels that extend from the front side of the floatation assembly 120 to the intermediate net support ring 115 and a plurality of connecting panels 113C ("darts") that extend between and connect adjacent pairs of the separate panels. For example the intermediate net support ring 115 may be formed as an HDPE pipe ring, or fiberglass tubing or the like. In the current embodiment the intermediate net support ring 115 is a circular and hollow ring.

The cover panel 112 extends over and closes a top end of the enclosure assembly 110. An optional net stand 114 in the region encircled by the float platform 130 provides intermediate support to the cover panel 112. In this embodiment the net stand 114 is supported and maintained in a desired position by the plurality of spoke cables 118 that extend between and connect non-adjacent float platforms 130.

Figure 4A:
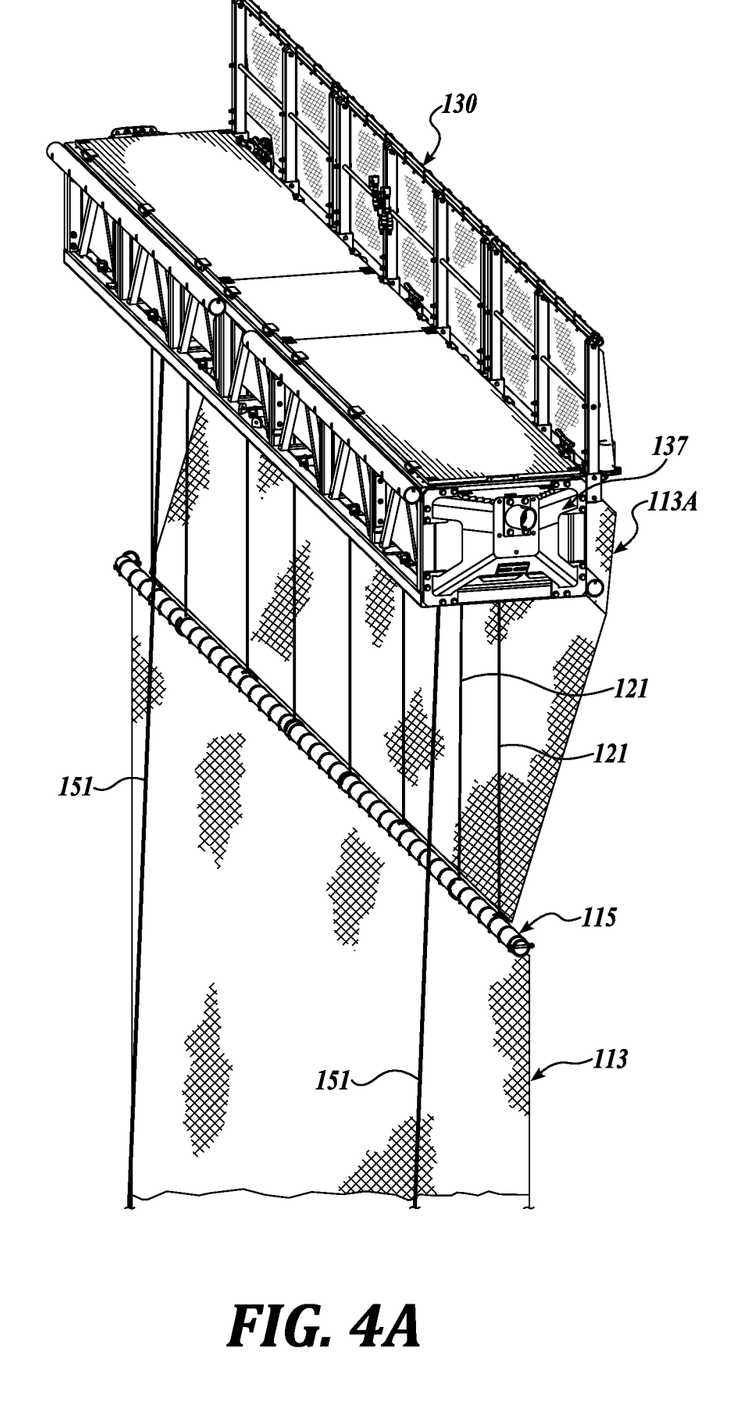
FIG. 4A is a perspective view of a single float platform for the fish pen shown in FIG. 1A, showing portions of the support cables and enclosure supported by the float platform.
Figure 4B:
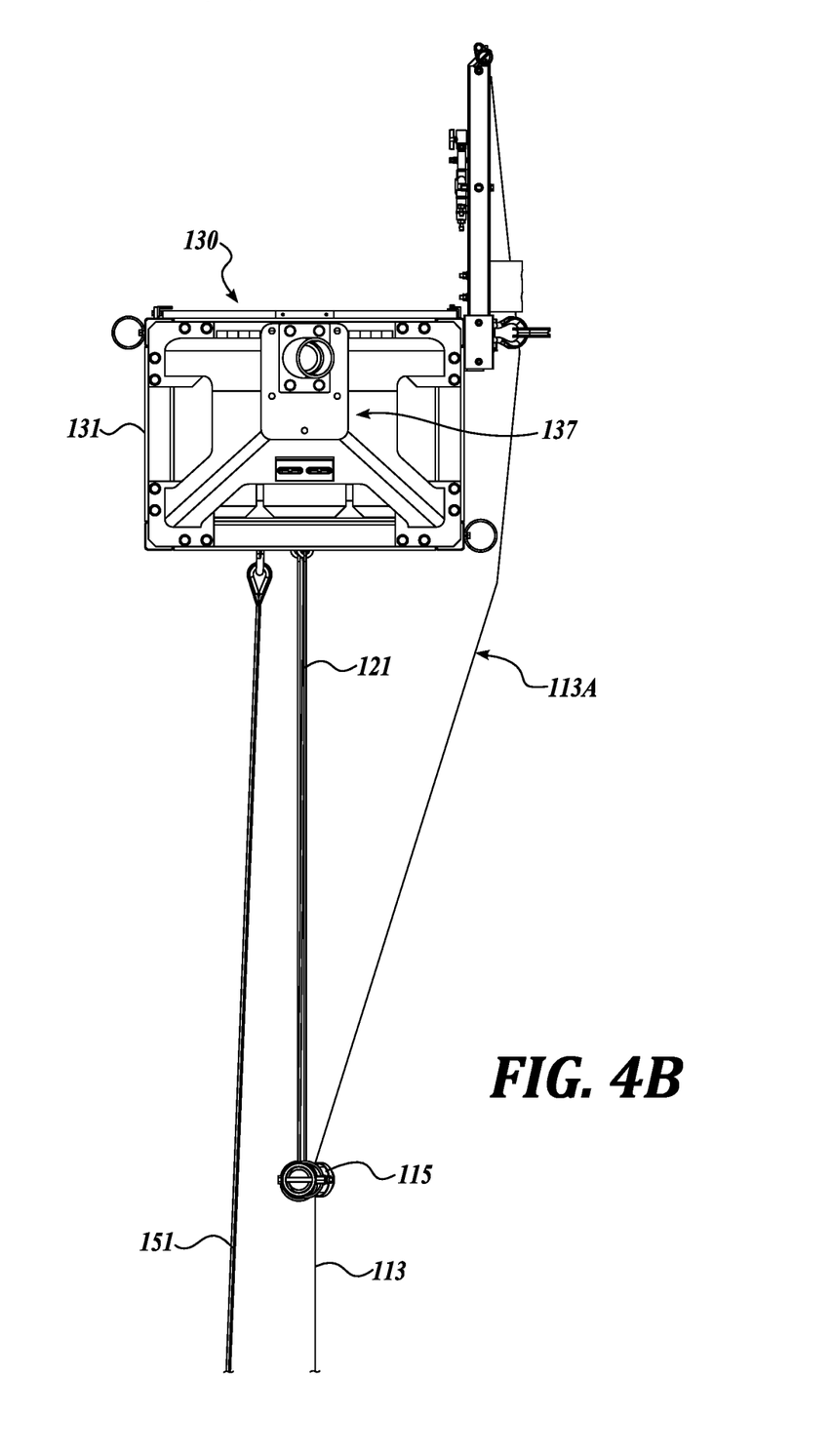
FIG. 4B is an end view of the float platform shown in FIG. 4A.

Refer now also to FIG. 4A showing a detail in-board view of a single float platform 130 and portions of the related enclosure components, and to FIG. 4B showing an end view of the assembly shown in FIG. 4A. In the current embodiment the jump net portion 113A extends from a top of the rail assembly 133 of the float platform 130 at least to the intermediate net support ring 115. For example, the jump_ net portion 113A has a vertical length of twenty percent of the vertical length of the main portion 113 or more. Cables 121 connect the intermediate net support ring 115 to the float platform 130 and are attached to the float platform 130 at a central location at or near the longitudinal centerline of the bottom of the main body 131 of the float platform 130. The cables 121 may be attached to the float platform 130 at a position near a centerline of the float platform 130, for example, within the center one-third of the main body 131 of the float platform 130 or within the middle one-quarter of the main body 131 of the float platform 130. In another embodiment the cables 121 supporting the intermediate net support ring 115 are substantially along the centerline of the main body 131 of the float platform 130. It will be appreciated that during use the main portion 113 of the mesh enclosure assembly 110 is supported by the intermediate net support ring 115, which is configured to hang from a middle portion of the float platforms 130 such that the weight of the enclosure assembly 110 is substantially reacted generally along or near a longitudinal centerline of the float platforms 130. In this configuration the complexity of balancing the floatation assembly 120, particularly during submerging and raising the fish pen 100 is greatly diminished and the stability of the float platforms 130 is significantly improved, when the fish pen 100 is stationed at the water surface, when the fish pen 100 is submerged, and during transitions between surface and submerged stations.

Similarly, the tension members 151 that support the weight ring assembly 150 are connected to the frame 134 of the float platforms 130 at an interior location between the net ring cables 121 and the outboard end of the frame 134, near a centerline of the float platforms 130, for example, within the center third of the float platforms 130.

While illustrative embodiments have been illustrated and described, it will be appreciated that various changes can be made therein without departing from the spirit and scope of the invention.

The embodiments of the invention in which an exclusive property or privilege is claimed are defined as follows:

1. A submersible aquaculture pen configured to be controllably submersible in a body of water such that the entire aquaculture pen can be moved between a surfaced position wherein an upper portion of the aquaculture pen is at or above the surface of the body of water and in the submerged position the entire aquaculture pen is below a top surface of the body of water, the aquaculture pen comprising:
    an annular floatation assembly comprising a plurality of float platforms connected end to end with platform joints, wherein each float platform is at a side of an annular polygon floatation structure, the annular floatation assembly having an inboard side and an outboard side, wherein each of the plurality of float platforms comprises at least one variable floatation member centrally placed between a fixed floatation member respectively, on the left and right end portions of each float platform, the variable floatation members being configured to be controllably provided with a gas such that the aquaculture pen has a net positive buoyancy in the body of water, and configured to be controllably provided with a liquid such that the aquaculture pen has a net negative buoyancy;
    a weight ring suspended from the floatation assembly by a first plurality of tension members that are attached to a bottom side of the floatation assembly at first transverse locations between the inboard side and the outboard side of the floatation assembly;
    a net support ring suspended from and directly below the floatation assembly by a second plurality of tension members that are attached to the bottom side of the floatation assembly at second transverse locations in a middle one-third of the floatation assembly between the inboard side and the outboard side of the floatation assembly such that the net support ring remains submerged below the floatation assembly; and
    a mesh enclosure comprising a main portion having an upper end that is attached to the net support ring, a jump net portion that extends from the net support ring to the inboard side of the floatation assembly, and a top portion that closes an upper end of the mesh enclosure, wherein the main portion of the mesh enclosure is supported by the floatation assembly through the net support ring, wherein the entire aquaculture pen includes the weight ring.

2. The aquaculture pen of claim 1, wherein the first transverse locations are located in the middle one-third of the floatation assembly between the inboard side and the outboard side of the floatation assembly.

3. The aquaculture pen of claim 2, wherein the first transverse locations are outboard of the second transverse locations.

4. The aquaculture pen of claim 1, wherein the plurality of float platforms each comprise a main body portion and a rail assembly extending upwardly from an inboard side of the float platform.

5. The aquaculture pen of claim 4, wherein the jump net portion of the mesh enclosure extends to a top end of the rail assembly.

6. The aquaculture pen of claim 1, further comprising a plurality of upper spoke cables that extend across the floatation assembly, wherein each of the plurality of upper spoke cables connect one of the plurality of float platforms to a non-adjacent one of the plurality of float platforms.

7. The aquaculture pen of claim 6, further comprising a net stand located within a region surrounded by the annular floatation assembly and configured to engage the plurality of upper spoke cables.

8. The aquaculture pen of claim 1, wherein the plurality of float platforms comprise eight float platforms arranged in an octagonal annular structure.

9. The aquaculture pen of claim 1 wherein the aquaculture pen is configured to be moved between a surfaced position and a submersed position.

10. The aquaculture pen of claim 1, further comprising a plurality of pendant weights suspended from the weight ring.

11. A submersible aquaculture pen configured to be controllably submersible in a body of water such that the entire aquaculture pen can be moved between a surfaced position wherein an upper portion of the aquaculture pen is at or above the surface of the body of water and in the submerged position the entire aquaculture pen is below a top surface of the body of water, the aquaculture pen comprising:
  a floatation assembly comprising a plurality of float platforms connected end-to-end to define a closed polygon, wherein each of the plurality of float platforms comprises at least one variable floatation member centrally placed between a fixed floatation member respectively, on the left and right end portions of each float platform, the variable floatation members being configured to be controllably provided with a gas such that the aquaculture pen has a net positive buoyancy in the body of water, and controllably provided with a liquid such that the aquaculture pen has a net negative buoyancy;
  a weight ring suspended from the floatation assembly by a first plurality of cables that are attached to central portions of the floatation assembly between an inboard side and an outboard side of the floatation assembly;
  a net support ring suspended from and directly below the floatation assembly by a second plurality of cables that are attached to central portions of the floatation assembly in a middle one-third of the floatation assembly between the inboard side and the outboard side of the floatation assembly such that the net support ring remains submerged below the floatation assembly; and
  a mesh enclosure comprising a main portion having an upper end that is attached to the net support ring, a jump net portion that extends from the net support ring to the inboard side of the floatation assembly, and a top portion that closes an upper end of the mesh enclosure;
  wherein the main portion of the mesh enclosure is supported by the floatation assembly through the net support ring.

12. The aquaculture pen of claim 11, wherein the first plurality of cables are attached to the floatation assembly outboard of the second plurality of cables.

13. The aquaculture pen of claim 11, wherein the plurality of float platforms each comprise a main body portion and a rail assembly extending upwardly from an inboard side of the float platform.

14. The aquaculture pen of claim 13, wherein the jump net portion of the mesh enclosure extends to a top end of the rail assembly.

15. The aquaculture pen of claim 11, further comprising a plurality of upper spoke cables that extend across the floatation assembly, wherein each of the plurality of upper spoke cables connect one of the plurality of float platforms to a non-adjacent one of the plurality of float platforms.

* * * * *